US005642908A

United States Patent [19]

Mascitelli

[11] Patent Number: 5,642,908

[45] Date of Patent: Jul. 1, 1997

[54] SLEEVE FOR THE FIXING OF A MANUAL PUMP GROUP TO A GLASS BOTTLE

[75] Inventor: Francesco Mascitelli, Pescara, Italy

[73] Assignee: SAR S.p.A., San Giovanni Teatino, Italy

[21] Appl. No.: 543,920

[22] Filed: Oct. 17, 1995

[30] Foreign Application Priority Data

| | | | |
|---|---|---|---|
| Oct. 17, 1994 | [IT] | Italy | RM94A0672 |
| Sep. 26, 1995 | [IT] | Italy | RM940211 U |

[51] Int. Cl.[6] .................................................. F16L 55/00

[52] U.S. Cl. .................... 285/148.19; 285/331; 285/921; 222/321.7; 222/321.9

[58] Field of Search .............................. 222/321.1, 321.7, 222/321.9, 570; 285/921, 331, 45, 175, 369

[56] References Cited

U.S. PATENT DOCUMENTS

| | | | |
|---|---|---|---|
| 3,146,920 | 9/1964 | Benjamin | 222/321.7 |
| 4,773,553 | 9/1988 | Van Brocklin | 222/321.9 X |
| 5,096,094 | 3/1992 | Guilbert | 222/321.9 X |
| 5,299,703 | 4/1994 | Cater | 222/321.7 X |
| 5,301,852 | 4/1994 | Mancini | 222/321.9 |
| 5,363,993 | 11/1994 | Mascitelli | 222/321.9 |

FOREIGN PATENT DOCUMENTS

| | | | |
|---|---|---|---|
| 567369 | 10/1993 | European Pat. Off. | 222/321.7 |
| 571280 | 11/1993 | European Pat. Off. | 222/321.1 |

*Primary Examiner*—Terry Lee Melius
*Assistant Examiner*—Heather Schackelford
*Attorney, Agent, or Firm*—Browdy and Neimark

[57] ABSTRACT

The invention relates to a sleeve (1) for the fixing of a pump (2) to a bottle with a neck (3) enlarged at the mouthpiece (4). The upper part (1*a*) of the sleeve (1) has tubular elements: one external tubular element (10) for receiving a metallic covering (5) and an internal tubular element (11) for receiving and restraining the pump (2), and a base transversal element (12) resting on the mouthpiece (4). An annular gasket is interposed between the base transversal element (12) and mouthpiece (4). The lower tubular part (1*b*) of the sleeve is to be inserted onto the mouthpiece (4) and is held in place in an undercut (4*a*) by means of rounded projecting parts (16) shown internally by the part (1*b*). The lower tubular part (1*b*) is provided with a plurality of external facings (15). The part (1*b*) also has externally a plurality of step projections (20) between the facings (15).

4 Claims, 3 Drawing Sheets

SLEEVE FOR THE FIXING OF A MANUAL PUMP GROUP TO A GLASS BOTTLE

BACKGROUND OF THE INVENTION

The present invention relates to an airtight sleeve for the fixing of a manual pump assembly to a bottle, generally made of glass, with a neck which is enlarged at the mouthpiece. The pump assembly is used, for example, for the nebulization of perfumes.

PRIOR ART

Prior art techniques teach the use of removable clamping devices for a pump assembly to a glass bottle.

In order to achieve a reliable, convenient and rapid assembling of the pump assembly to the bottle, some of the prior art devices are equipped with a connection which is normally made of plastic or sometimes metal material. The upper part of such connection is used for receiving and restraining a pump group striking against the mouthpiece of the bottle neck, while the lower part is removably constrained to the said neck by means of a constraint coupling, below the enlargement of the mouthpiece of the bottle neck. Such constraint coupling offers other advantages, other than permitting a rapid disassembling and different recycling of manufacturing materials, once the emptying of the bottle contents has taken place. For example, with respect to other clamping means, such as plastically deformable crimping ends or nipples, the constraint coupling also makes it possible to reduce the packaging dimensions, thus improving the aesthetics thereof.

Among prior art devices for removable clamping having a constraint connection between the pump assembly or sprayer and bottle neck, there are some technical solutions which have at least partially address the problem of constraint coupling. As a coupling means between the pump and the bottle neck, a prior art solution envisages the use of a cylinder shaped constraint connection, having, on the upper part, a first row of retaining tongues for the body of the pump, and having, on the lower part, a second rim of single pawls spaced out by small prismatic projections turned towards the outside. When the connection is inserted onto the bottle neck, the internal protrusions of the pawls of the second rim are inserted into the undercut which is determined by the enlargement of the mouthpiece of the bottle neck, while the external projections are inserted into the respective longitudinal seats of a metallic covering of the connection which restrains the pawls in the undercut.

The above mentioned connection definitely works satisfactorily, but said connection needs accuracy when assembling because the connection and the bottle have to be perfectly coaxial so as to avoid hits in the flexion of each pawl towards the outside.

A solution to this problem, as taught by the U.S. application Ser. No. 4,773,553, foresees, as a coupling means between the sprayer and the bottle neck, a cylinder shaped constraint connection having an upper part of a smaller diameter to permit the insertion of the body of the sprayer, and a lower part of a larger diameter. Protrusions outwardly flared protrude from the internal peripheral surface of the lower part. Such connection becomes distorted by means of a metallic covering in such a way that said connection is fixed and sealed to the container. In fact, the structure of the connection as described above allows, from an operating point of view, a synergy of all the protrusions in the hold of the bottle neck below the mouthpiece, but said hold, because of the outward flaring of the protrusions, takes place only after the insertion of the metallic covering of the connection. For this reason, during the assembling, it has to be considered the fact that such connection does not remain attached on its own to the bottle neck and probably the hold is not particularly efficient so as to allow a correct airtight positioning also after the insertion of the metallic covering. The solution described above causes additional problems. Traditional glass containers with flared necks, that is to say containers with enlarged mouthpieces, are indeed subject to minor dimension variations such as those of the thickness of the flange. The solution described above can not be used unless the containers are previously treated in order to reduce such variations, thus causing additional costs.

The object of the present invention is to eliminate the above mentioned drawbacks.

SUMMARY OF THE INVENTION

In particular, the present invention aims to allow the effective airtight coupling of a pump assembly onto a bottle neck enlarged at the mouthpiece, through elastic constraint coupling means to the undercut of the enlarged neck of the bottle.

An aim of the present invention is to allow a rapid assembling with a uniform hold and a rapid disassembling after the removal of said hold.

A further aim of the present invention is to make available a coupling means having a strong and elastic deformable structure easy to manufacture in a single moulding operation.

The invention resolves the problem of supplying a sleeve for the airtight coupling of a pump assembly to a bottle neck enlarged at the mouthpiece and having an undercut of the type comprising an upper part shaped as a solid of revolution, obtained through rotation of a U-shaped surface about an axis of symmetry (Y—Y), said upper part having an external tubular element for receiving a metallic covering for said sleeve on said bottle neck, an internal tubular element for holding and restraining said pump assembly, and a base transversal element for resting on said mouthpiece. Between said base transversal element and mouthpiece an airtight annular gasket is interposed which, generally speaking, comprises a lower tubular part, coaxial and with the respective generatrixes substantially coplanar to said larger external tubular element. Said lower tubular part, is to be elastically inserted onto said mouthpiece of the neck and is restrained by constraint in the undercut thereof by means of a plurality of rounded projections, each of which has, in a plan form, a circular segment shape shown internally by the lower part and equally distanced in circumferential succession and corresponding to a plurality of lightened or thinned facings similarly equidistant, obtained externally on said part; said lower part also has externally a plurality of equal step projections, obtained between each of said facings and the following, so as to supply perimetrical resting projections for the metallic covering in the phases of fixing the sleeve onto the bottle.

BRIEF DESCRIPTION OF THE DRAWINGS

Further characteristics and advantages of the present invention will better emerge from the detailed description that follows, of a preferred embodiment hereunder illustrated in the form of a non-limiting example in which.

DESCRIPTION OF THE PREFERRED EMBODIMENTS

Figure 1:
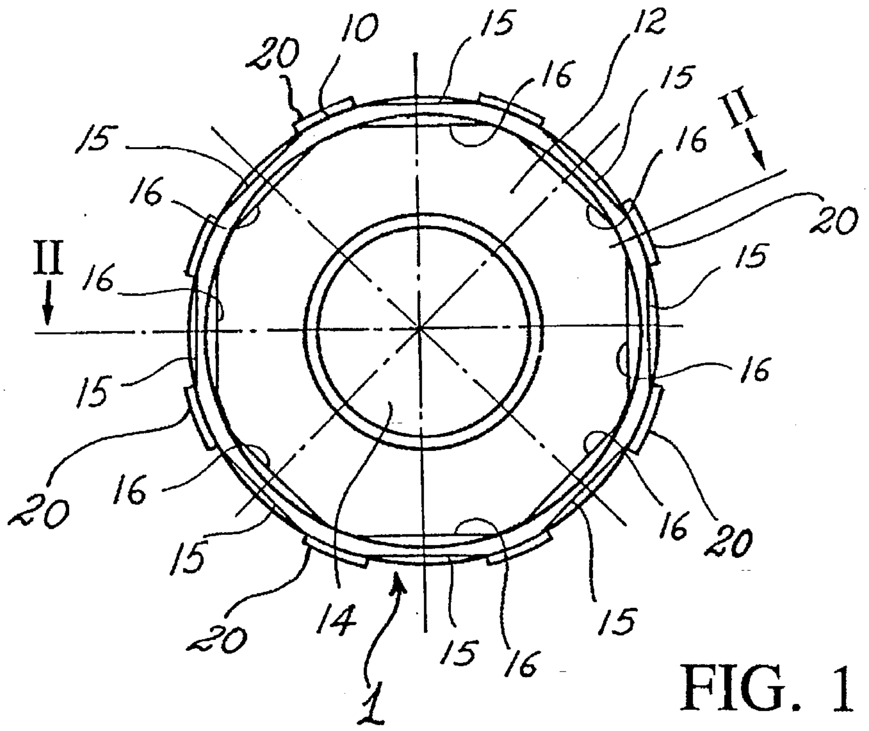
FIG. 1 shows a view in plan form from the bottom of a sleeve according to the present invention.
Figure 2:
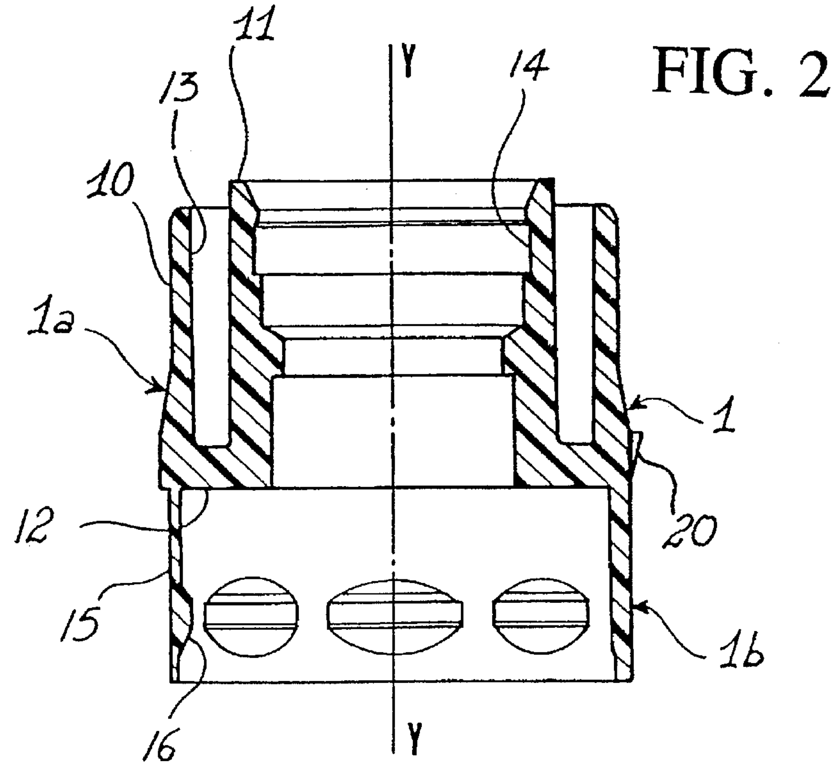
FIG. 2 shows, in a longitudinal section, said sleeve according to lines A—A of FIG. 1.
Figure 3:
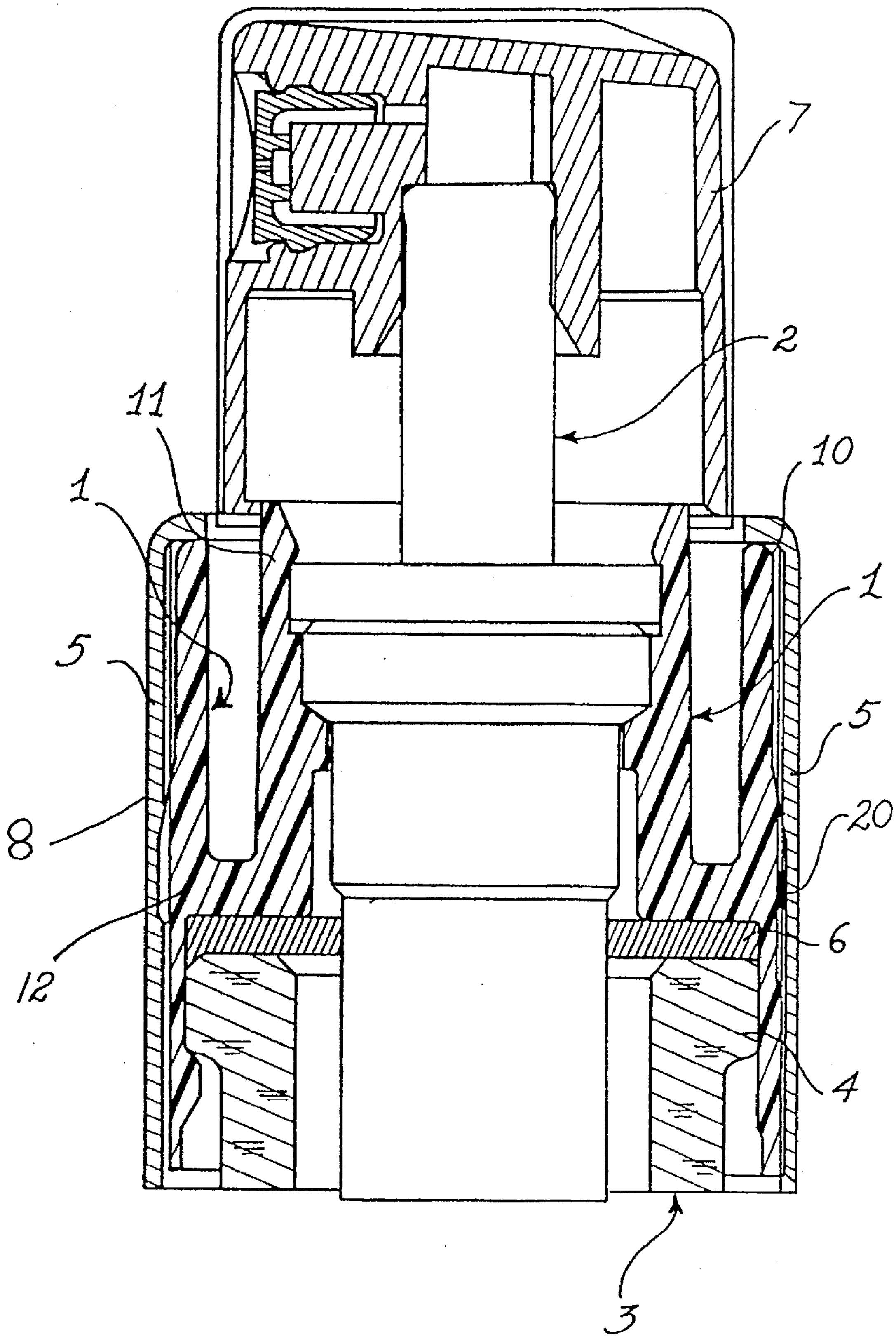
FIG. 3 shows, in a longitudinal section, as the one in FIG. 2, a pump assembly (not sectioned) fixed onto a bottle with a neck enlarged at the mouthpiece including the sleeve according to the present invention.

According to the present invention in FIG. 3, 1 denotes a sleeve for the airtight fixing of a manual pump assembly, denoted with 2 as a whole, to a bottle with a neck 3 enlarged at the mouthpiece 4. The sleeve 1 according to the present invention is hereunder described with reference to FIGS. 1 and 2. Said sleeve comprises an upper part 1*a* and a lower part 1*b* taking the position of the bottle as a reference point. The upper part 1*a* is shaped as a solid of revolution obtained by rotation of a U-shaped surface about the axis of symmetry Y—Y. For this reason, the upper part 1*a* is fitted with an external tubular element 10, an internal tubular element 11 and a base transversal element 12, so as to define an annular groove 13.

Figure 4:
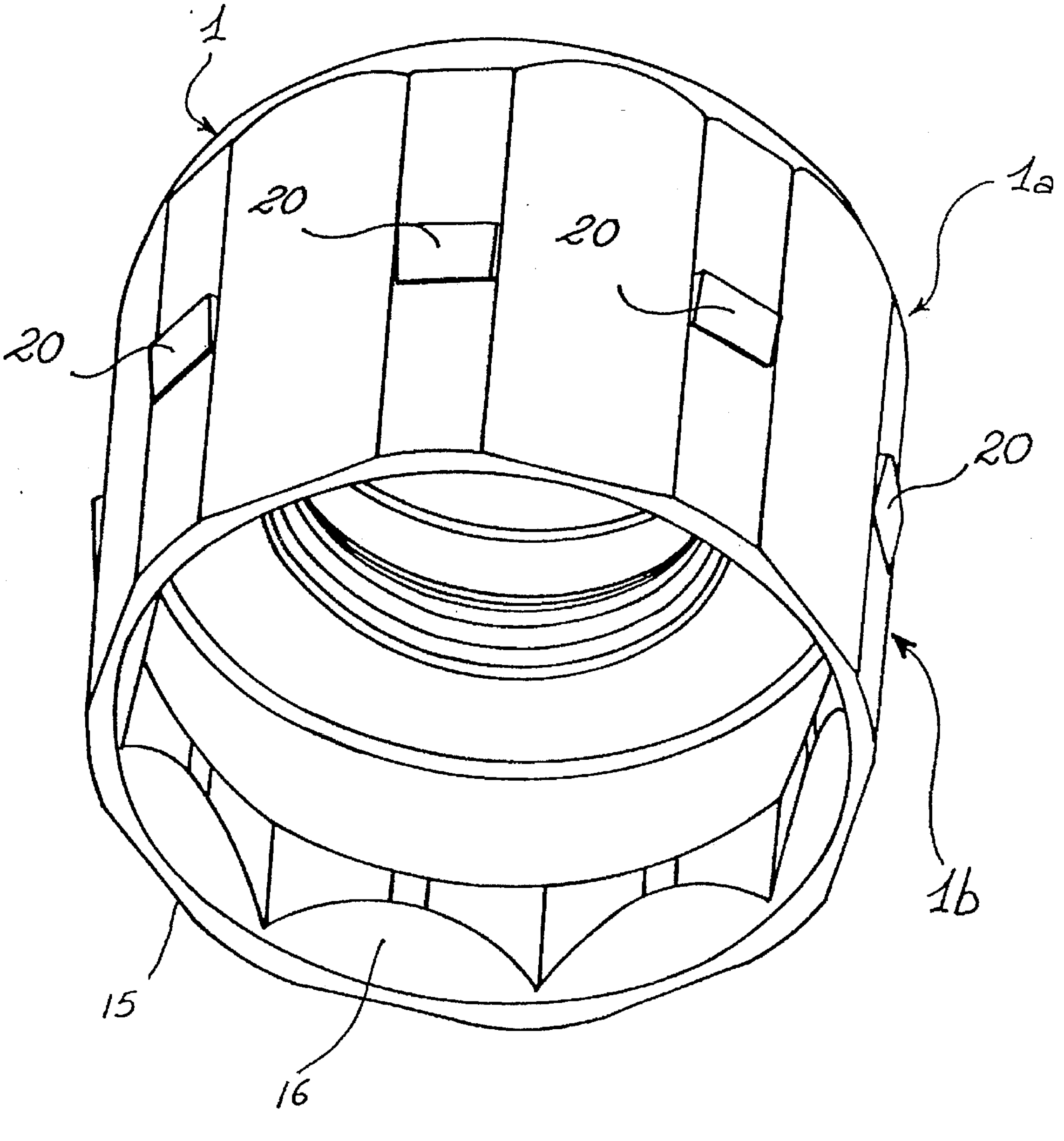
FIG. 4 shows a perspective view from the bottom of the sleeve according to the present invention.

With reference to FIG. 3, the external tubular element 10 is shaped in such a way as to receive a metallic covering 5 for the sleeve 1 on the neck 3 of the bottle, said metallic covering having only an aesthetic purpose. Conventionally, as shown in FIG. 4, the metallic covering 5 is shaped as a ring nut and has an internal knurl 8, and in the upper part it is shouldercurved with the upper end of the external tubular element 10.

The internal tubular element 11 is shaped to receive and restrain a pump assembly 2, whose external shape corresponds to the cylindrical cavity 14 defined by the tubular element 11. In the attached figures, such cavity 14 is so evident in its striking and restraint surfaces for the pump assembly 2 that a detailed description can be omitted. Furthermore, it should be clear that the shape of the internal cavity 14 is determined by the particular shape of the pump assembly and for this reason can be correspondingly different.

The base transversal element 12 is designed to rest on the mouthpiece 4 of the bottle, and an annular airtight gasket 6 is interposed between said base transversal element 12 and said mouthpiece 4 of the bottle as shown in FIG. 3. The annular airtight gasket 6 has an external diameter which is the same as the external diameter of the mouthpiece 4 and an internal diameter which is the same as the lowest external diameter of the pump assembly 2, for a slightly forced airtight coupling.

The annular groove 13 is conventionally used for the sliding of a push button 7 for the manual starting of the pump assembly 2.

According to the present invention, the lower part 1*b* of the sleeve, made in one single piece with the upper part 1*a*, is tubularly shaped and is coaxial and with the respective generatrixes substantially coplanar to the external tubular element 10 of the upper part 1*a*. The lower part 1*b* is designed to be inserted elastically onto the mouthpiece 4 of the neck 3 of the bottle and restrained by constraint in the undercut 4*a* thereof.

For this reason and according to the present invention, the lower part 1*b* is lightened or thinned with facings 15 which are equidistant, and has internally, opposite each facing 15, a rounded projection 16 which is inserted into the undercut 4*a* by means of an elastic reaction of the projection 16. Each projection 16, has, in a plan form, a circular segment shape.

As shown in FIGS. 1, 2 and 4 the lower part 1*b* also has a plurality of equal step projections 20 designed to act as a perimetrical resting projection for the metallic covering 5 during the initial assembling phase of the sleeve 1 onto the bottle. The step projections 20 are regularly obtained between each facing 15 and the following. In the embodiment represented, the facings 15, the projections 16 and the step projections 20 are eight in number, but the number can obviously differ.

The assembling of the sleeve carrying the pump assembly and the metallic covering 5, which is in a resting position to the steps 20, is carried out rapidly in a single operation. In fact, by applying an axial force onto the metallic covering, by means of a tool, which is not shown in the figures, the insertion onto the bottle is achieved. Such axial force causes elastic flexion deformation towards the outside and above all in correspondence with the facings 15 of the sleeve 1, which act as localised weakenings which increase the uniform and total elasticity of the lower part 1*b*. However, such weakenings are balanced by the circumferential strengthening which is represented by the same number of internal projections 16, which elastically fit underneath the undercut 4*a*. Once the fixing of the sleeve onto the bottle is obtained, further actions of said axial force causes the exceeding of said step projections 20 by the metallic covering 5, also by means of a partial deformation of its ends, and the final positioning of the metallic covering, as shown in figure S.

The structure of the lower part 1*b*, as described above, has particular advantages in both the manufacturing phase, by having the possibility to mould the sleeve as if the projections did not provide for undercuts, and in the assembling and disassembling phase of the sleeve with respect to the bottle, still from a functioning point of view. With reference to this last point, in fact, the sealing of the pump assembly results more effective with respect to prior art devices because the annular gasket is compressed during the assembling phase and remains squashed between the bottle and the sleeve, thus preventing the drawing out of the liquid contained inside the bottle. Advantageously, the sleeve described above has a structure with a high capacity of elastic recovery of the flexion, which is peripherally uniform towards the outside to avoid the risk of localised plastic deformations which are frequently detected in prior art solutions, in particular in correspondence with the weak areas caused by notches or deep incisions in the structure.

The present invention is susceptible to numerous variations or changes without falling outside the scope of the present invention. Furthermore, all details can be replaced by technically equivalent elements.

Obviously, in actual practice, it is possible to make variations and/or improve the present invention without falling outside the field of the following claims.

What is claimed:

1. A sleeve assembly for fixing a manual pump assembly to a bottle, the bottle having a neck (3) which is enlarged at a mouthpiece (4) of the bottle and an undercut (4*a*) between the neck (3) and the mouthpiece (4), the sleeve assembly comprising:

an upper part (1*a*), said upper part (1*a*) having an external tubular element (10) and an internal tubular element (11), said external tubular element (10) and said internal tubular element (11) being coaxial, a base transversal element (12) joining a lower end of the external tubular element (10) to a lower end of the internal tubular element (11) to form a groove (13) with a U-shaped cross-section between the external tubular element (10) and the internal tubular element (11), a sealing annular gasket (6) engaged to said base transversal element (12) when the sleeve assembly is assembled on the mouthpiece (4), a lower tubular part (16) coaxial with and integrally joined to said upper part (1*a*), a plurality of facings (15) equidistantly spaced on an outer periphery of the lower tubular part (1*b*), each of said plurality of facings (15) acting to thin a tubular wall and enhance an elasticity of said lower tubular part (1*b*), a plurality of rounded projections (16) equidistantly spaced on an inner periphery of the lower tubular part (1*b*) opposite respectively to the plurality of facings (15), and a plurality of step projections (20), located between each of said plurality of facings (15), wherein said external tubular element (10) is adapted to receive thereon a metal cover (5) for constraining said sleeve (1) on said neck (3) and said internal tubular element (11) and groove (13) are adapted to receive and constrain the pump assembly (2), and wherein when the sleeve assembly (1) is assembled on the bottle to the mouthpiece (4), the plurality of rounded projections (16) are engaged on the undercut (4*a*) and the plurality of step projections (20) form a perimeter rest surface for the metal cover (5).

2. A sleeve assembly as claimed in claim 1, wherein said plurality of facings (15), said plurality of rounded projections (16) and said plurality of step projections (2) are each eight in number.

3. A sleeve assembly as in claim 1, wherein said sealing annular gasket (6) has an external diameter which is equal to an external diameter of said mouthpiece (4) and an internal diameter which is equal to a minimum external diameter of said pump assembly (2), in order to obtain a slightly forced sealed airtight coupling there-between.

4. A sleeve assembly as in claim 1, wherein the metal cover (5) having an internally-knurled ferrule fits abuttingly against an upper end of said external tubular element (10) of upper portion (1*a*) of the sleeve assembly (1).

* * * * *